A. L. SESSIONS.
SHEET METAL STRUCTURE.
APPLICATION FILED JUNE 16, 1909.

1,018,728. Patented Feb. 27, 1912.

Witnesses:
F. H. Elliott
Q. T. Berkovich

Inventor.
Albert L. Sessions.
by Arthur B. Jenkins
Attorney.

UNITED STATES PATENT OFFICE.

ALBERT L. SESSIONS, OF BRISTOL, CONNECTICUT.

SHEET-METAL STRUCTURE.

1,018,728.      Specification of Letters Patent.      Patented Feb. 27, 1912.

Application filed June 16, 1909. Serial No. 502,447.

*To all whom it may concern:*

Be it known that I, ALBERT L. SESSIONS, a citizen of the United States, and a resident of Bristol, in the county of Hartford and State of Connecticut, have invented a new and Improved Sheet-Metal Structure, of which the following is a specification.

My invention relates to the class of devices formed from sheet metal, and the object of the invention is to provide a device of this class in which the parts supporting a strain shall be strengthened to a degree to successfully withstand such strain; and a further object of the invention, among others, is to provide a device of this class which may be produced at a minimum cost of manufacture and in an expeditious manner. A form of device in the use of which these objects may be attained is illustrated in the accompanying drawings, in which—

Figure 1:
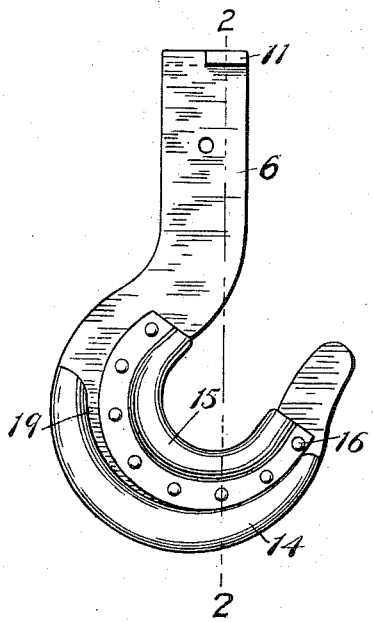
Figure 2:
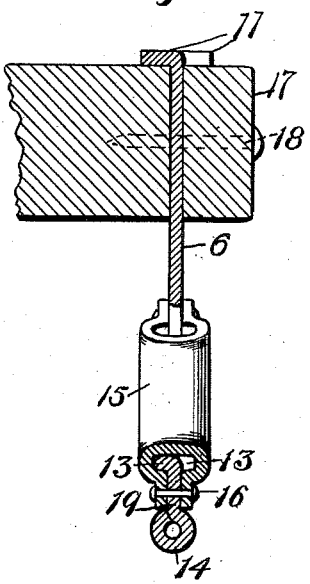
Figure 4:
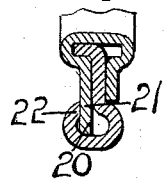
Figure 3:
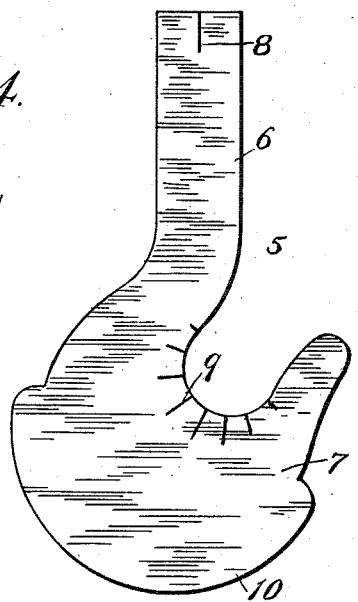

Figure 1 is a side view of the completed structure, in this instance a hook. Fig. 2 is a view in cross-section through the structure on plane denoted by line 2—2 of Fig. 1. Fig. 3 is a view of a blank from which a structure, as a hook, is to be produced. Fig. 4 is a detail view in cross-section through the hook showing an edge of the rim of the hook held by the roll at the outer edge.

While my invention may be variously applied to different structures and is especially applicable to the production of such structures from thin metal, preferably sheet metal, as it finds ready adaptation in a hook especially designed for attachment of or connection with the trace of a harness, I have shown and described herein such a structure for the purpose of disclosure of the invention. It will, however, be understood that the invention is not limited to use in such a structure, nor even to the special form of construction shown, as its use in other structures and departures to a greater or lesser extent from the construction shown will be deemed as within the scope and intent of the invention.

In the accompanying drawings the numeral 5 denotes a blank preferably cut or stamped from sheet metal having a shank portion 6 and a hook portion 7. The shank portion is provided with a slot 8 and the hook portion with slots 9. The hook portion has also a projection 10.

In forming the hook the parts on opposite sides of the slot 8 are bent in opposite directions forming clips 11 at the end of the shank 6. The portions between the slits 9 are bent in opposite directions forming lips 13 located at the inner edge of the curve of the hook. The projection 10 is bent into tubular form to constitute a roll 14 extending about the outer edge of the curved portion of the hook.

A cover 15 is applied to the inner curved edge of the hook, this cover being made preferably from sheet metal and bent to closely envelop the lips 13, being extended about the outer edges of these lips and then passing along the body part 19 of the hook to which the free edges of this cover are secured. In the preferred form of construction and as shown herein these free edges of the cover extend downward to the roll 14 and are properly secured in place, preferably as by means of rivets 16.

A hook is thus produced which may be readily attached as to a whiffletree 17, the shank being passed through an opening in the whiffletree and the clips 11 serving to retain the hook in place. If desired a fastening pin 18 may also be employed to assist in holding the hook in place.

It will now be observed that the structure thus produced while being composed of comparatively thin metal is so constructed that all parts will properly withstand the strains which may be placed upon them in use. Where the strain is lengthwise of the structure only a single thickness is required, and where the strains are produced crosswise of any part of the structure, these are so reinforced as to successfully withstand such strains.

The inner or holding edge of the hook is not only properly constructed as to strength, but this edge is also enlarged and given a width considerably greater than that of the thickness of the plate, so that a strap or other part which may be engaged by the hook will have a sufficient bearing surface and will not be subjected to short bends.

The edges of the inner rim or cover of the hook may be secured in various ways and in many instances the inherent rigidity of the cover will be sufficient. If desired an edge 20 of the rim may be secured between the edge 22 of the roll and the body part of the plate 19, as shown at 21 in Fig. 4 of the drawings.

I claim—

1. An attaching device having along its edge intended to resist a strain an outturned lip located at an angle to the plane of the plate from which the structure is formed, and a cover inclosing said lip and secured to the flat portion of said edge and plate.

2. An attaching device having along one edge intended to support a strain lips turned in opposite directions and located at an angle to the plane of the plate from which the structure is formed, and a cover passed over said edge and inclosing said lips and with the free edge of the cover secured to the face of said plate.

3. An attaching device having along one edge intended to resist a strain a roll integrally formed from the plate composing the structure and at the opposite edge an outturned lip, and a cover wrapped about said edge and inclosing said lip and with the free edges of the cover secured to the face of said plate.

4. An attaching device having at one edge a roll integrally formed with the metal composing the structure and at the opposite edge lips turned in opposite directions and located at an angle to the plane of said plate, and a cover wrapped about said edge and inclosing said lips and with the edge of said cover secured to the face of said plate.

5. An attaching device having at one edge intended to resist a strain a roll integrally formed from the plate of which the structure is formed, lips formed at the opposite edge of said plate, and a cover wrapped about said edge and inclosing said lips and with the free edges of the cover extending along the plane of the plate to said roll and secured to the face of said plate.

6. A hook formed from thin metal and having about its inner curved portion a lip located at an angle to the face of the plate, and a cover wrapped about said inner edge and inclosing said lip and with the free edges of the cover secured against the sides of the hook.

7. A hook formed from thin metal and having at its outer curved portion a roll integrally formed from the plate of which the hook is composed, lips projecting in opposite directions and extending along the inner curved edge of the hook, and a cover wrapped about said inner curved edge and inclosing said lips and with the free edges of the cover extending along the face of the hook and secured thereto.

8. A hook formed of thin metal and having at the inner edge of the hook a lip located at an angle to the face of the hook, a cover wrapped about the inner edge of the hook and with its free edges extending along the face thereof and secured thereto, and a shank having clips formed at its opposite end arranged to be bent in opposite directions to secure the hook in position.

9. An attaching device having along one edge intended to support a strain lips turned in opposite directions and located at an angle to the plane of the plate from which the structure is formed, and a cover passed over said edge and rigidly secured to and inclosing said lips.

10. An attaching device having at one edge a roll integrally formed with the metal composing the structure and at the opposite edge lips turned in opposite directions and located at an angle to the plane of said plate, and a cover wrapped about said edge and rigidly secured to and inclosing said lips.

11. A hook formed from thin metal and having about its inner curved portion a lip located at an angle to the face of the plate, and a cover wrapped about said inner edge and inclosing said lip, and with the free edges of the cover fastened to the lip as by rivets.

ALBERT L. SESSIONS.

Witnesses:
ARTHUR B. JENKINS,
LENA E. BERKOVITCH.